United States Patent
Humer et al.

(10) Patent No.: US 11,072,265 B2
(45) Date of Patent: Jul. 27, 2021

(54) VEHICLE SEAT ASSEMBLY WITH FRONT SEAT PAN HEIGHT ADJUSTMENT MECHANISM

(71) Applicant: Lear Corporation, Southfield, MI (US)

(72) Inventors: Mladen Humer, West Bloomfield, MI (US); Mark R. Keyser, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 82 days.

(21) Appl. No.: 16/574,915

(22) Filed: Sep. 18, 2019

(65) Prior Publication Data

US 2021/0078469 A1    Mar. 18, 2021

(51) Int. Cl.
  *B60N 2/427*    (2006.01)
  *B60N 2/02*    (2006.01)

(52) U.S. Cl.
  CPC ....... *B60N 2/42763* (2013.01); *B60N 2/0232* (2013.01); *B60N 2/4279* (2013.01)

(58) Field of Classification Search
  None
  See application file for complete search history.

(56) References Cited

U.S. PATENT DOCUMENTS

| | | | | |
|---|---|---|---|---|
| 4,384,698 A * | 5/1983 | Courtois | ............... | B60N 2/0232 248/396 |
| 4,470,318 A * | 9/1984 | Cremer | ................ | B60N 2/2231 74/353 |
| 5,203,600 A * | 4/1993 | Watanabe | ............ | B60N 2/4221 296/68.1 |
| 6,386,631 B1 * | 5/2002 | Masuda | ............... | B60N 2/4221 297/216.1 |
| 6,394,548 B1 * | 5/2002 | Battey | ....................... | A47C 7/14 297/342 |
| 6,450,573 B1 * | 9/2002 | Yamaguchi | .......... | B60N 2/4221 297/216.1 |
| 6,648,409 B1 * | 11/2003 | Laporte | ................ | B60N 2/4221 297/216.1 |
| 7,192,087 B2 * | 3/2007 | Adragna | .................. | B60N 2/62 297/216.1 |
| 9,457,751 B1 | 10/2016 | Stancato et al. | | |
| 9,994,135 B2 | 6/2018 | Line et al. | | |

(Continued)

FOREIGN PATENT DOCUMENTS

| | | | |
|---|---|---|---|
| DE | 102004019221 A1 * | 11/2005 | ......... B60N 2/42763 |
| DE | 1973915 B4 | 6/2007 | |

(Continued)

*Primary Examiner* — David E Allred
(74) *Attorney, Agent, or Firm* — Brooks Kushman P.C.

(57) ABSTRACT

A vehicle seat assembly and a method of controlling a vehicle seat assembly are provided. The vehicle seat assembly has a frame, and a seat pan extending from a forward region to a rearward region, with the rearward region of the seat pan rotatably connected to the frame. A torque tube is supported for rotation by the frame and extends transversely across the seat pan. At least one cam is supported by the torque tube for rotation therewith, and the at least one cam extends outwardly from the torque tube to an associated cam surface. The cam surface supports the forward region of the seat pan and is shaped such that the forward region of the seat pan is raised relative to the rearward region in response to rotation of the torque tube.

18 Claims, 4 Drawing Sheets

(56) References Cited

U.S. PATENT DOCUMENTS

| | | | |
|---|---|---|---|
| 2002/0003365 A1* | 1/2002 | Yamaguchi | B60N 2/42763 297/216.1 |
| 2002/0053792 A1* | 5/2002 | Yamaguchi | B60N 2/42763 280/748 |
| 2002/0053793 A1* | 5/2002 | Yamaguchi | B60N 2/42763 280/748 |
| 2006/0138797 A1* | 6/2006 | Wang | B60N 2/42745 296/68.1 |
| 2007/0222270 A1* | 9/2007 | Combest | B60N 2/42763 297/452.21 |
| 2008/0054150 A1* | 3/2008 | Stuby | B60N 2/0232 248/371 |
| 2009/0045614 A1 | 2/2009 | Katsuda | |
| 2010/0060045 A1* | 3/2010 | Gross | B60N 2/4221 297/216.1 |
| 2014/0246888 A1* | 9/2014 | Renaudin | B60N 2/2806 297/250.1 |
| 2016/0185265 A1* | 6/2016 | Romer | B60N 2/686 297/216.1 |
| 2018/0018625 A1 | 1/2018 | Spruell et al. | |
| 2019/0039480 A1 | 2/2019 | Hung | |
| 2020/0361349 A1* | 11/2020 | Line | B60N 2/06 |

FOREIGN PATENT DOCUMENTS

| | | | | |
|---|---|---|---|---|
| EP | 1415853 A2 | * | 5/2004 | B60N 2/42763 |
| FR | 2747080 A1 | * | 10/1997 | B60N 2/42781 |
| FR | 2772689 A1 | * | 6/1999 | B60N 2/4221 |
| FR | 2797823 A1 | * | 3/2001 | B60N 2/309 |
| GB | 2347902 A | * | 9/2000 | B60R 22/1955 |
| JP | 10309967 A | * | 11/1998 | B60N 2/4221 |
| JP | 3904664 B2 | | 4/2007 | |
| KR | 20050008911 A | | 1/2005 | |
| KR | 20170034063 A | * | 3/2017 | |
| KR | 101746450 B1 | | 6/2017 | |
| WO | WO-2005023581 A1 | * | 3/2005 | B60N 2/0276 |

* cited by examiner

VEHICLE SEAT ASSEMBLY WITH FRONT SEAT PAN HEIGHT ADJUSTMENT MECHANISM

TECHNICAL FIELD

Various embodiments relate to a vehicle seat assembly with a seat pan and a mechanism for adjusting a height of the front of a seat pan.

BACKGROUND

A vehicle seat assembly may be provided with a mechanism for adjustment of a forward region of a seat pan. Examples of vehicle seat assemblies may be found in US Patent Publication No. 2009/0045614 A2, Korean Patent No. KR 101746450 B1, and Japanese Patent No. JP 3904664 B2.

SUMMARY

In an embodiment, a vehicle seat assembly is provided with a frame, a seat pan extending from a forward region to a rearward region, with the rearward region of the seat pan rotatably connected to the frame, and a shaft supported for rotation by the frame and extending transversely across the seat pan. At least one cam is supported by the shaft for rotation therewith, with the at least one cam extending outwardly from the shaft to an associated cam surface. The cam surface supports the forward region of the seat pan and is shaped such that the forward region of the seat pan is raised relative to the rearward region in response to rotation of the shaft.

In a further embodiment, the cam surface is formed as an involute of a base circle.

In another further embodiment, the cam surface is formed as an Archimedean spiral or a logarithmic spiral.

In a further embodiment, the vehicle seat assembly has at least one rail connected to the seat pan and extending longitudinally therealong, with the cam surface of the at least one cam in contact with the at least one rail.

In a yet further embodiment, one of the cam and the rail define a recess extending transversely therefrom, and the other of the cam and the rail define a protrusion extending therefrom. The protrusion is sized to be received within the recess to constrain movement of the seat pan along a vertical axis.

In another further embodiment, the vehicle seat assembly has a gearset drivingly connected to the shaft to rotate the shaft and cam, and an electric motor drivingly connected to the gearset. The electric motor rotates in a first direction to raise the forward region of the seat pan relative to the rearward region, and rotates in a second direction to lower the forward region of the seat pan relative to the rearward region.

In another yet further embodiment, the vehicle seat assembly has a user interface to receive a user input requesting a vertical height adjustment of the forward region of the seat pan, and a controller in communication with the user interface and the electric motor to control the electric motor in response to the user input.

In a further embodiment, the vehicle seat assembly has a controller in communication with the electric motor to control the electric motor to raise the forward region of the seat pan in response to receiving a signal from an active vehicle system with a sensor.

In a yet further embodiment, the raised forward region of the seat pan provides a load path from an occupant to the seat in a longitudinal direction. The seat pan provides another load path from the occupant to the seat in a vertical direction.

In another further embodiment, the cam surface is positioned aft of a forward edge of the seat pan by more than twenty five percent and less than fifty percent of a distance from the forward edge to a rearward edge of the seat pan.

In a further embodiment, another shaft is supported for rotation by the frame and extends transversely across the seat pan, with the shaft and the another shaft rotating about an axis of rotation. At least another cam is supported by the another shaft for rotation therewith, with the at least another cam extending outwardly from the another shaft to an associated another cam surface. The another cam surface supports the forward region of the seat pan and is shaped such that the forward region of the seat pan is raised relative to the rearward region in response to rotation of the another shaft.

In another embodiment, a vehicle seat assembly has a frame, and a seat pan extending from a forward region to a rearward region, with the rearward region of the seat pan rotatably connected to the frame about a first transverse axis of rotation. A lower surface of the forward region forms first and second follower surfaces. A torque tube is supported for rotation by the frame about a second transverse axis of rotation, with the torque tube extending transversely across the seat pan. First and second cams are connected to the torque tube for rotation therewith and are spaced apart from one another along the second transverse axis of rotation. The first and second cams extend outwardly to first and second cam surfaces, respectively, and the first and second cam surfaces support the forward region of the seat pan and are in contact with the first and second follower surfaces, respectively. An electric motor is drivingly connected to the torque tube via a gearset to rotate the torque tube between a first angular position and a second angular position, with the first and second cam surfaces moving the first and second follower surfaces in a direction substantially perpendicular to the second axis of rotation. The first and second cam surfaces are shaped to continuously raise the forward region of the seat pan as the torque tube moves from the first position to the second position.

In a further embodiment, the vehicle seat assembly has a controller to control the electric motor to rotate the torque tube and raise or lower the seat pan in response to receiving a signal indicative of a user request for a seat pan height adjustment.

In another further embodiment, the vehicle seat assembly has a controller to control the electric motor to rotate the torque tube and raise the seat pan in response to receiving a signal indicative of an event from an active vehicle system.

In a further embodiment, each of the first and second cam surfaces are formed as an involute of a base circle.

In another further embodiment, an angle between the seat pan and a horizontal plane is raised by at least ten degrees by the torque tube being rotated from the first angular position to the second angular position.

In a further embodiment, one of the first cam and the first follower surface defines a recess, and the other of the first cam and the first follower surface defines a protrusion, wherein the protrusion is sized to be received within the recess to constrain movement of the seat pan along a vertical axis as the first cam rotates.

In an embodiment, a method of controlling a vehicle seat assembly is provided. A rearward region of a seat pan is provided and is rotatably connected to a frame about a first transverse axis of rotation, the seat pan extending from a forward region to the rearward region. A shaft is provided and is rotatably connected to the frame about a second transverse axis of rotation, with the shaft extending transversely across the seat pan and having at least one cam extending outwardly from the shaft and connected for rotation therewith. The forward region of the seat pan is supported with the at least one cam. In response to a first signal indicative of an event from an active vehicle system, an electric motor drivingly connected to the shaft is controlled to rotate the shaft from a first angular position to a second angular position such that the at least one cam raises the forward region of the seat pan in a direction perpendicular to the second axis of rotation.

In a further embodiment, in response to a second signal indicative of a user request for a seat pan height adjustment, the electric motor is controlled to rotate the shaft to raise or lower the forward region of the seat pan.

In a yet further embodiment, the electric motor is controlled to operate at a first speed in response to receiving the first signal, and operate at a second speed in response to receiving the second signal, wherein the first speed is greater than the second speed.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
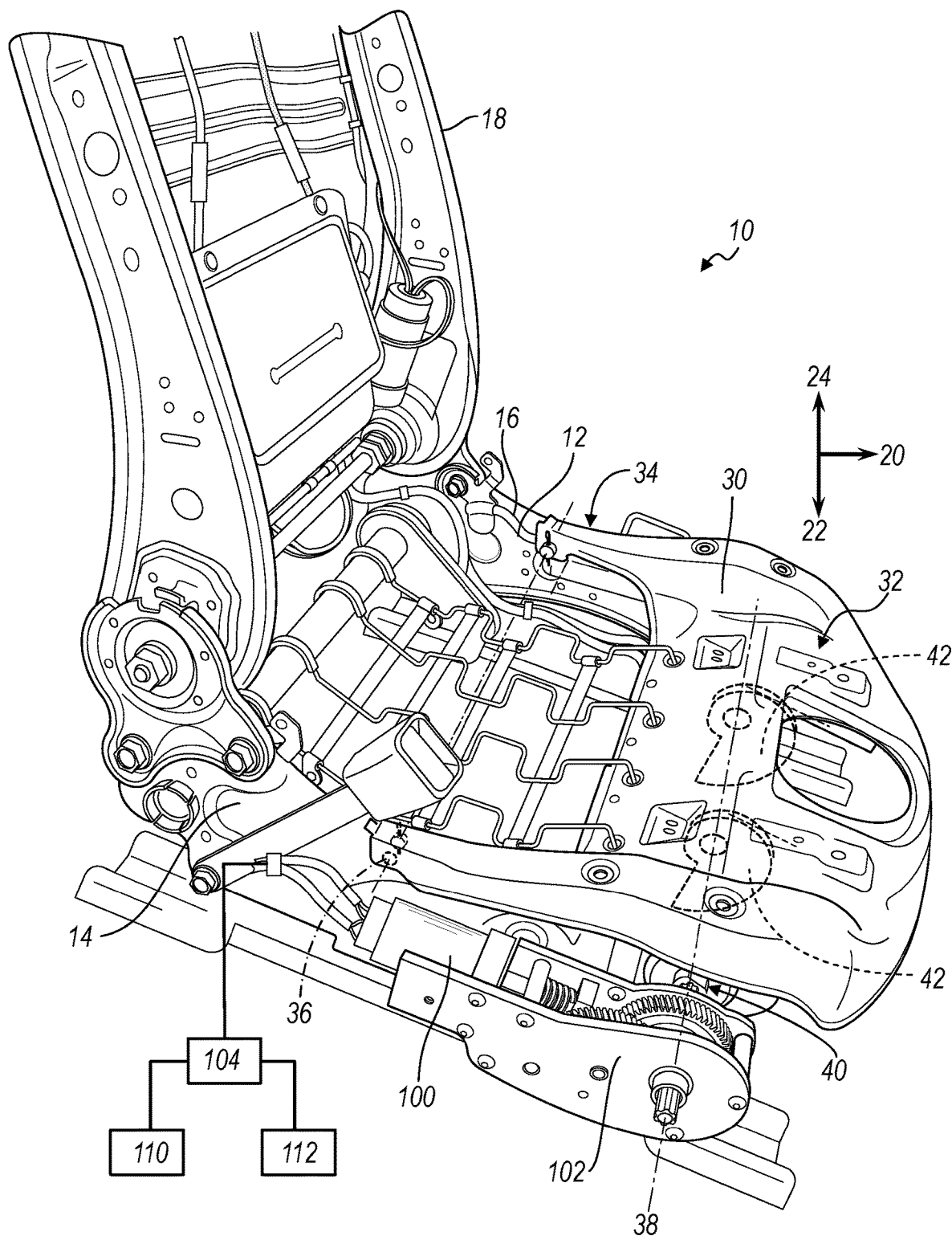
FIG. 1 is a perspective view of a vehicle seat assembly according to an embodiment.

FIG. 1 illustrates a vehicle seat assembly 10. The vehicle seat assembly 10 may be a forward passenger seat assembly or a rear passenger seat assembly, e.g. second row. The vehicle seat assembly 10 has a frame 12 that is connected to an underlying surface. The underlying surface may be the cabin floor, or may be vehicle seat tracks that are connected to the vehicle floor to allow for the seat 10 to slide forward and rearward in the vehicle.

With respect to the disclosure, a longitudinal axis 20, a transverse axis 22, and a vertical axis 24 are shown, and may be relative to the installation of the vehicle seat 10 in a vehicle. The axes may be orthogonal to one another. As used herein, the term substantially refers to an angle that is within five degrees of the stated angle or orientation, or within ten degrees of the stated angle or orientation; or within five percent of a dimension such as a length, or within ten percent of a dimension such as a length.

The frame 12 has first and second sides 14, 16. The frame supports a seat pan 30 for rotation relative to the frame 12. The seat pan 30 and frame 12 support cushion and trim elements.

The frame 12 also supports a seat back frame 18. The seat back frame 18 may rotate relative to the frame 12 to allow for adjustment of the seat back angle or recline, and may be connected to the first and second sides of the frame. The seat back frame 18 is provided with cushion and trim elements.

The seat pan 30 extends from a forward region 32 to a rearward region 34. The rearward region 34 of the seat pan 30 is rotatably connected to the first and second sides 14, 16 of the frame 12 about a first transverse axis of rotation 36.

Figure 2:
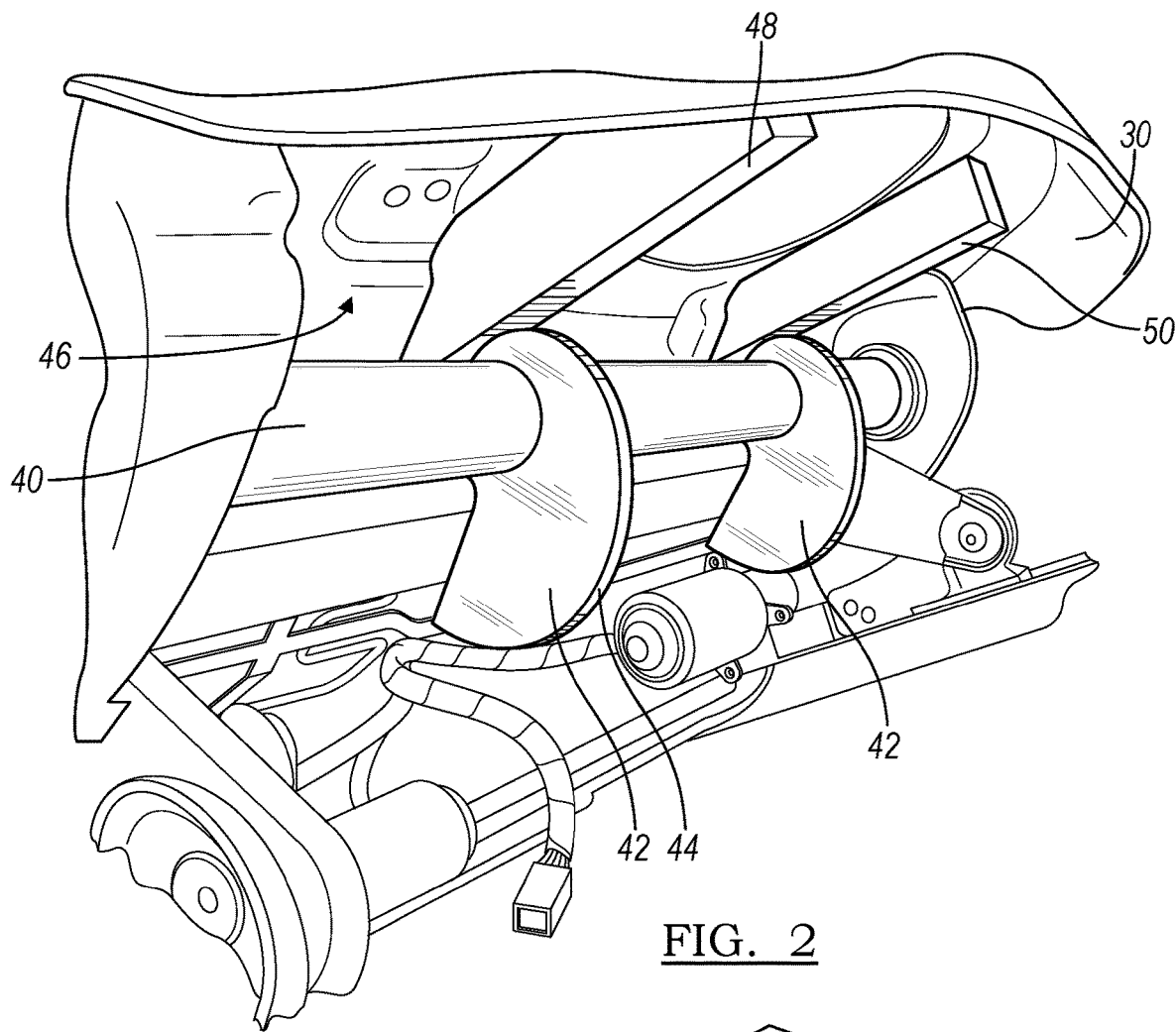
FIG. 2 is a partial perspective view of the vehicle seat assembly of FIG. 1.

With reference to FIGS. 1-2, the vehicle seat assembly 10 has a torque tube 40 or shaft 40 that is supported for rotation by the frame 12 and is rotatably connected to the first and second sides 14, 16 of the frame. The torque tube 40 extends underneath the seat pan 30 and extends transversely across the seat pan 30. The torque tube 40 rotates about a second axis of rotation 38. The torque tube 40 may be supported by bearings, bushings, or similar elements within apertures formed in the frame 12. The seat assembly 10 may have a single torque tube 40 as shown. In another example, the seat assembly 10 may be provided with a split torque tube 40 or shaft 40 such that there are two shaft portions 40. For a seat assembly 10 with two shaft portions, the shaft portions may rotate about a common axis of rotation 38, with each shaft portion supported by a respective first and second side of the frame. Additional bearings and support brackets may be provided for a seat assembly 10 with two shaft portions.

At least one cam 42 is connected to the torque tube 40 for rotation with the torque tube 40, e.g. the cam 42 is fixed for rotation with the torque tube 40. Each cam 42 therefore rotates about the second axis of rotation 38. Each cam 42 has an associated cam surface 44. The cam 42 extends outwardly from the torque tube 40 to the associated cam surface 44. Each cam surface 44 supports a lower surface 46 of the forward region 32 of the seat pan 30.

Each cam surface 44 is shaped such that the forward region 32 of the seat pan 30 is raised relative to the rearward region 34 in response to rotation of the torque tube 40. As the torque tube 40 and cams 42 rotate, the seat pan 30 rotates about axis 36 and the forward region of the seat pan 30 moves. The contact point between the cam surface 44 and the lower surface 46 of the seat pan 30 may be positioned aft of a forwardmost edge of the seat pan 30 by more than twenty percent and less than fifty percent of a distance from the forwardmost edge to a rearwardmost edge of the seat pan 30. In a further example, the contact point between the cam surface 44 and the lower surface 46 of the seat pan 30 may be positioned aft of a forwardmost edge of the seat pan 30 by twenty-five to thirty percent of a distance from the forwardmost edge to a rearwardmost edge of the seat pan 30.

In the embodiment shown, the seat assembly 10 has first and second cams 42 with first and second cam surfaces 44. In another example, the seat assembly 10 may have more than two cams 42, e.g. three cams 42 with three associated cam surfaces 44. In yet another example, there may only be one cam 42, and the cam 42 may be shaped with one cam surface, 44 or with multiple cam surfaces 44, e.g. two, three, or more cam surfaces 44. The torque tube 40 may have more than one cam 42 connected thereto, as is shown in FIG. 2. Alternatively, and for a split torque tube 40 design, each shaft portion may support one or more associated cams 42.

For example, for a seat assembly 10 with two shaft portions, each of the shaft portions may support a single cam 42.

In one example, each cam 42 is formed from a plate, and has first and second sides that are opposed to one another and extend radially outward from an aperture through the plate to the cam surface 44. The aperture is sized such that the torque tube 40 is received therein. The cam surface 44 extends between and intersects the first and second sides. The cams 42 may be spaced apart from one another transversely along the torque tube 40. Each cam surface 44 has a single contact point with the lower surface of the seat pan 30. The cams 42 may be located relative to the torque tube 40 via a mechanical fastener, or via a process such as welding. The torque tube 40 and the cams 42 may both be formed from a metal or metal alloy. In another example, the torque tube 40 and/or the cams 42 may be formed from a plastic material.

In one example, the cam 42 is shaped such that the cam surface 44 forms an involute curve of a base circle. The base circle size may vary depending on the seat geometry, and in one example, the diameter of the base circle of the involute curve lies in a range of 10-25 millimeters.

In another example, the cam 42 is shaped such that the cam surface 44 forms a spiral shape, such as an Archimedean spiral and a logarithmic spiral. In other examples, the cam 42 may have other shapes that provide a cam surface 44 with an increasing distance from the second axis of rotation 38 about the cam.

The lower surface 46 of the forward region 32 of the seat pan 30 forms follower surfaces 48, with each follower surface 48 associated with one of the cam surfaces 44. In one example, the follower surfaces 48 are formed by the seat pan 30 itself such that the cam surfaces 44 are directly in contact with the seat pan 30.

Alternatively, the follower surfaces 48 may be formed by one or more rails 50 that are connected to the lower surface 46 of the seat pan 30 such that the cam surface 44 is in direct contact with the associated rail 50. The rails 50 may be formed from a plastic or other material having a lower coefficient of friction than the seat pan 30. For reference, the seat pan 30 may be formed from a metal, such as a stamped steel. Each rail 50 may extend longitudinally along the seat pan 30.

In one example, and as shown in FIG. 2, each of the rails 50 may be provided with a surface that is planar or substantially lower than the lower surface 46 of the seat pan 30 to interact with the associated cam surface 44. In another example, the lower surface of the rails 50 may be provided with a curved or otherwise shaped surface to interact with the associated cams 42.

Figure 3:
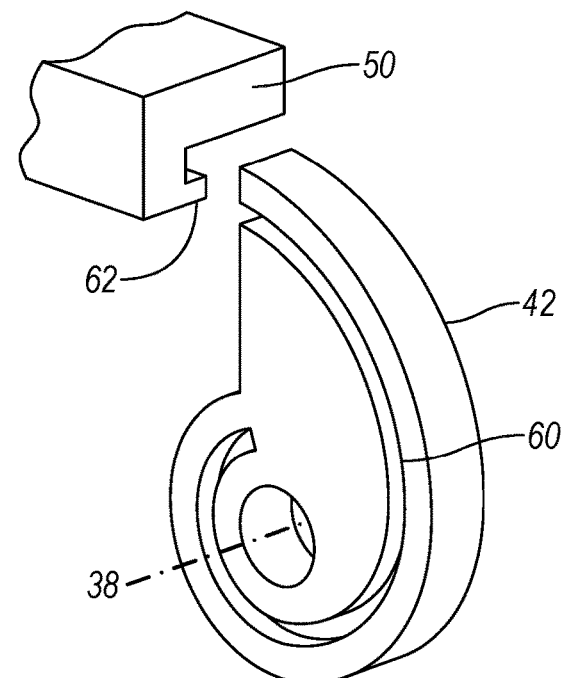
FIG. 3 is a schematic of a cam and follower surface according to another embodiment and for use with the vehicle seat assembly of FIG. 1.

In a further example, and as shown in FIG. 3 one of the rails 50 and the cam 42 may be provided with a recess 60 and the other of the rails 50 and the cam 42 may be provided with a protrusion 62. The protrusion 62 is sized to be received within the recess 60, and the protrusion 62 moves relative to the recess 60 as the cam 42 rotates relative to the seat pan 30. The recess 60 and the protrusion 62 cooperate to form a locating feature for the seat pan 30. The recess 60 and the protrusion 62 cooperate to provide a limit to prevent rotational movement of the seat pan 30 in an upward direction and away from the cams 42, e.g. to maintain contact of the seat pan 30 with the cams 42. The recess 60 and the protrusion 62 therefore cooperate to constrain movement of the seat pan 30 along a vertical axis 24 as the cam 42 rotates to move the seat pan 30 to prevent the seat pan from lifting away from the cam surface 44.

In the example shown, the rail 50 is provided with a protrusion 62 such as a lip, flange, or pin, and the cam 42 is provided with a recess 60. In another example, cam 42 is provided with a protrusion, and the rail 50 is provided with a recess. Each of the rail 50 and cam 42 pairs may be provided with associated recesses 60 and protrusions 62, or only some or one of the rail 50 and cam pairs may be provided with associated recesses and protrusions. The recess 60 forms a surface extending transversely, or along axis 22. The pin or protrusion 62 interfaces with the transverse surface of the recess 60. The protrusion 62 may be a simple pin that extends transversely, e.g. from a side of the rail 50, or may be provided as a transverse flange or lip extending from the side of the cam 42. In a further example, the protrusion 62 may have an L-shaped or T-shaped cross-sectional shape that fits into a corresponding recess or slot.

Referring back to FIGS. 1-2 and 4-5, the torque tube 40 is rotated by a prime mover 100 such as an electric motor. The electric motor 100 drives an input to a transmission 102 or gearset, which in turn drives or rotates the torque tube 40 and associated cams 42. The electric motor 100 may be powered using electrical energy on-board the vehicle, e.g. from a battery. The gearset 102 is provided as a reducing gearset such that a rotational speed of the output shaft is less than a rotational speed of the input shaft and electric motor 100. In one example, the gearset 102 includes at least one worm gear and/or at least one helical gear. The use of worm and/or helical gear(s) in the gearset 102 provides for a self-locking gearset to aid in maintaining a position of the torque tube 40, cams 42, and seat pan 30. In one example, and as shown, the electric motor 100 and the gearset 102 may be provided outside or outboard of the first and second sides 14, 16 of the frame. In another example, the electric motor 100 and the gearset 102 may be positioned between the first and second sides 14, 16 of the frame. For a vehicle seat assembly 10 with a split torque tube 40 and two shaft portions, the motor 100 may drive both shaft portions via a gearset 102 with two output shafts. In another example, each shaft portion may be driven by a respective motor 100 and gearset 102.

The vehicle seat assembly 10 has a controller 104. The controller 104 may be a controller associated with the vehicle seat assembly. The controller 104 may be connected to or in communication with other vehicle or system controllers. The controller may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The controller 104 is connected to the electric motor 100 to control the electric motor 100 to rotate in a first rotational direction, corresponding to a first rotational direction 106 for the torque tube 40 about the second axis of rotation 38. The controller 104 also controls the electric motor 100 to rotate in a second rotational direction opposite to the first rotational direction, that provides for the torque tube 40 rotating in a second rotational direction 108 about the second axis of rotation 38.

Figure 4:
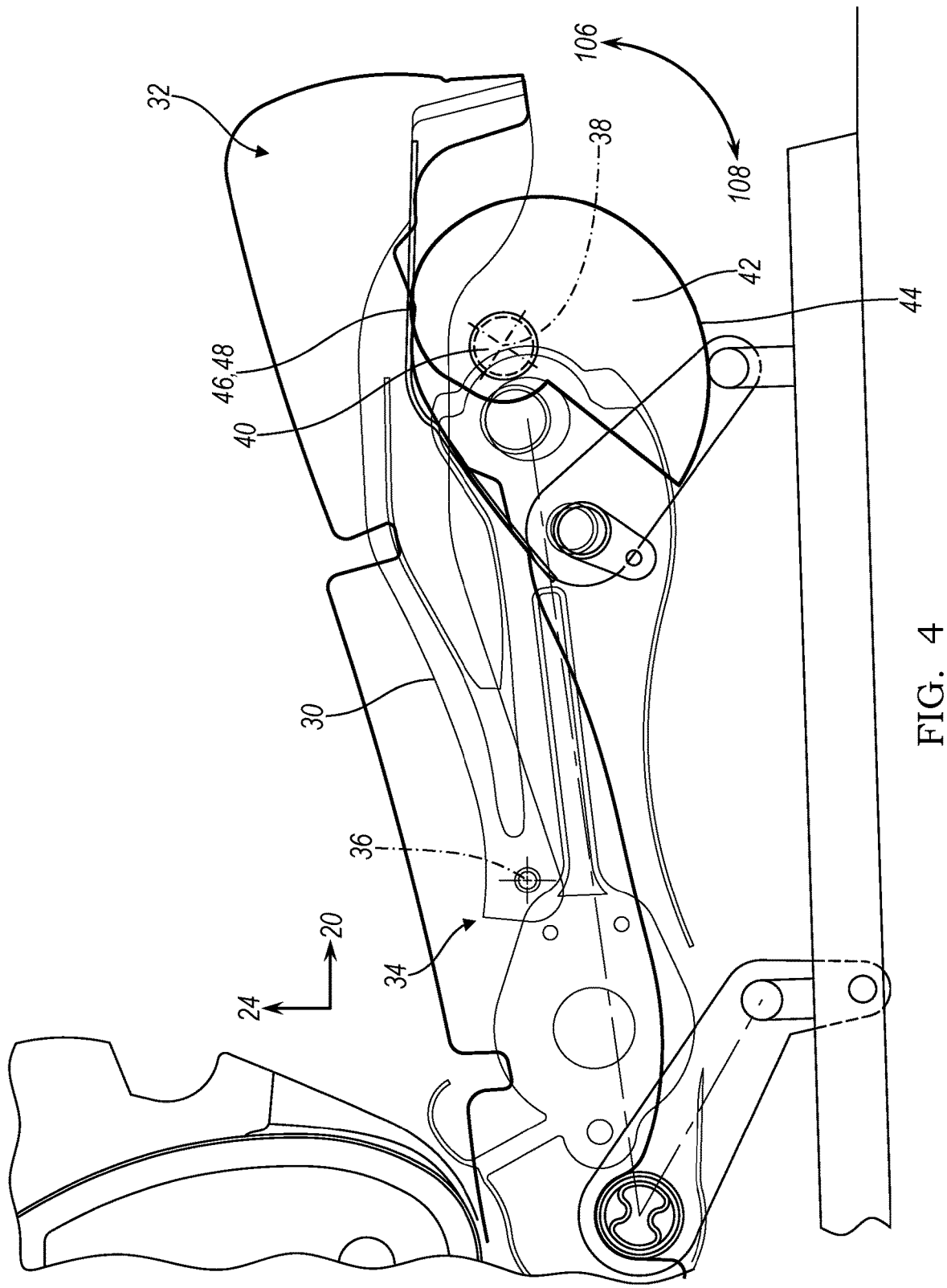
FIG. 4 is a side view schematic of the vehicle seat assembly of FIG. 1 with the seat pan in a first angular position.
Figure 5:
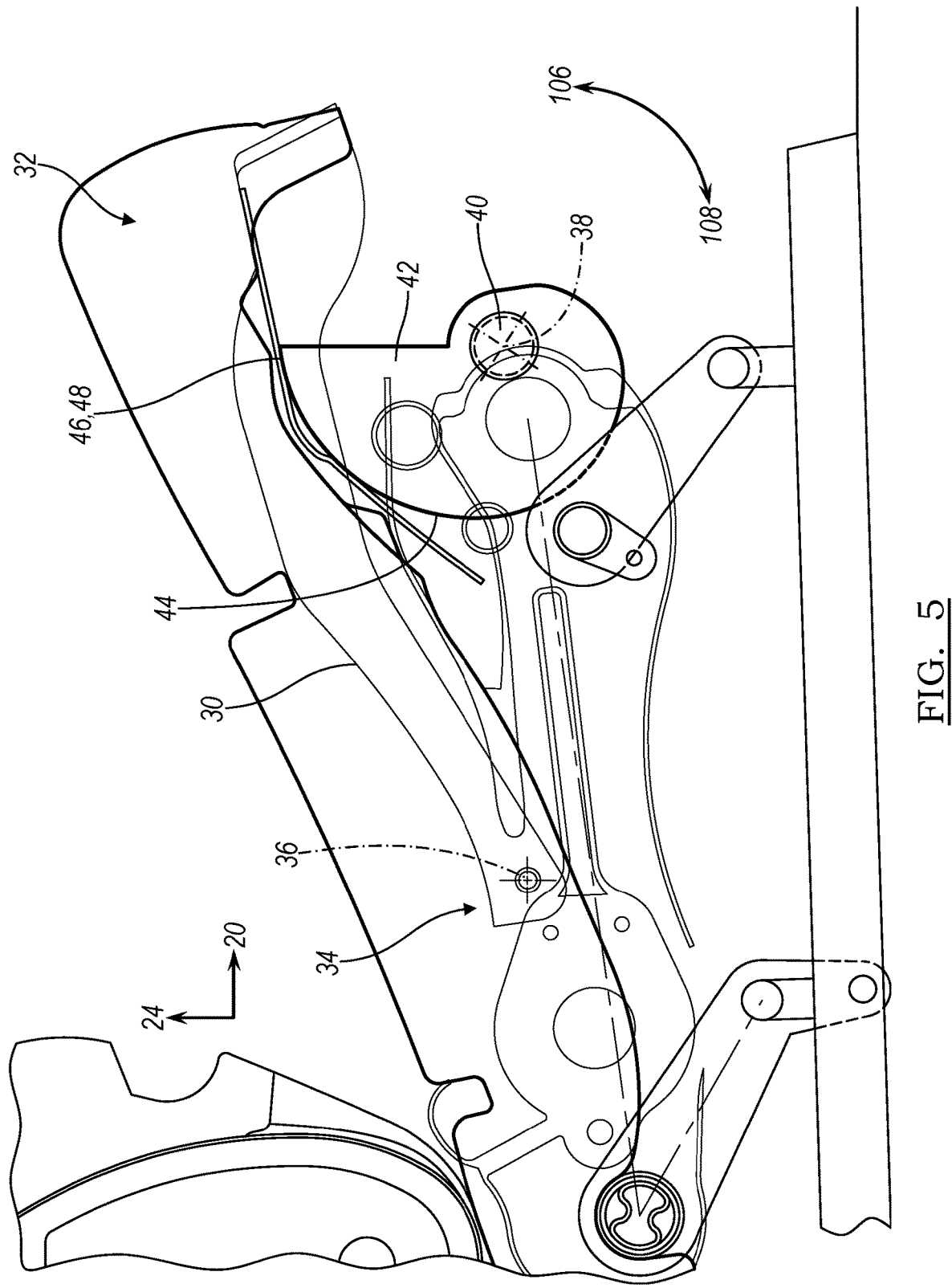
FIG. 5 is a side view schematic of the vehicle seat assembly of FIG. 1 with the seat pan in a second position.

The electric motor 100 rotating in a first direction causes the torque tube 40 and cams 42 to rotate in the first direction 106, and the forward region 32 of the seat pan 30 is thereby raised relative to the rearward region 34. The electric motor 100 rotating in a second direction causes the torque tube 40 and cams 42 to rotate in the second direction 108, and the forward region 32 of the seat pan 30 is thereby lowered relative to the rearward region 34. As the torque tube 40 rotates, the cams 42 and cam surfaces 44 rotate relative to the follower surfaces 48 on the seat pan 30. The cam surface 44 moves the associated follower surface 48 in a direction substantially perpendicular to the second axis of rotation 38 to raise or lower the forward region 32 of the seat pan 30 in a direction perpendicular to the second axis of rotation 38. The cam surfaces 44 are shaped to continuously raise the forward region 32 of the seat pan 30 as the torque tube 40 moves from the first position as shown in FIG. 4 to the second position as shown in FIG. 5.

The controller 104 receives a first input from a user interface 110. The user interface 110 may be provided by buttons or switches on the vehicle seat assembly 10, or may be provided via another vehicle user interface, such as a touch display screen. The user interface 110 allows a user to request a vertical height adjustment, either upwardly or downwardly, of the forward region 32 of the seat pan 30, e.g. to request a front height pan adjustment. In a further example, the user input may be stored in memory accessible by the controller 104, for example, within settings associated with a predetermined seat position for a memory vehicle seat assembly.

In response to receiving an input from the user interface 110 for a vertical height adjustment of the forward region 32 of the seat pan 30, or a seat pan 30 height adjustment, the controller 104 controls the electric motor 100 to rotate the torque tube 40 to either raise or lower the forward region 32 of the seat pan 30 to the desired location and position. The controller 104 may move the seat pan 30 upwardly or downwardly between a first angular position as shown in FIG. 4 and to a second angular position as shown in FIG. 5, or between any two positions within a range bounded by the first and second positions. When the seat pan 30 reaches the first position or the second position, the controller 104 stops the electric motor 100, as the travel limit for the seat pan 30 has been reached.

The controller 104 receives a second input from a vehicle system 112. In one example, the vehicle system 112 is an active or dynamic safety system. An active or dynamic vehicle safety system 112 may include various vehicle systems that receive and interpret signals from on-board vehicle sensors to help a driver control the vehicle. Furthermore, the vehicle safety system 112 includes forward-looking, sensor-based systems such as advanced driver-assistance systems (ADAS). An ADAS 112 may include adaptive cruise control, collision warning, avoidance, and/or mitigation systems, and the like. The ADAS 112 may further include sensors such as cameras, radar, LIDAR, and the like. The vehicle system 112 may provide a signal to the controller 104 when it is activated based on an event, such as a sensor indicating that another vehicle is within a specified proximity of the vehicle or approaching the vehicle at more than a specified rate or speed. In a further example, the signal to the controller 104 is only provided in response to the vehicle system 112 detecting a possible frontal event for the vehicle.

In response to receiving an input from the vehicle system 112 that is indicative of an event, the controller 104 controls the electric motor 100 to rotate the torque tube 40 to raise the forward region 32 of the seat pan 30 from its present position to the second position and increase a vertical height of the forward region 32 of the seat pan 30. In one example, the controller 104 rotates the torque tube 40 from the first position to the second position. In another example, the controller 104 rotates the torque tube 40 from an intermediate position to the second position. In a further example and if the seat pan 30 is already in the second position, the controller 104 maintains the seat pan 30 in the second position. The input from the vehicle system 112 may be provided by a signal from a sensor associated with the system 112, or a signal indicative of an event from an active safety system 112. When the seat pan 30 reaches the second position, the controller 104 stops the electric motor 100, as the travel limit for the seat pan 30 has been reached. The raised forward region 32 of the seat pan 30, or the seat pan 30 in the second position, provide a load path from an occupant of the seat into the seat pan 30 in the longitudinal direction. Furthermore, the load path from the occupant to the seat pan 30 may reduce a load between the occupant and a safety belt restraint system, or provide a secondary load path to the safety belt restraint system.

The shape of the cam 42 as described above provide for a reduced or a low amount of back-driving torque on the associated gearset 102 and motor 100. Back-driving torque from the seat pan 30 to the gearset 102 and motor 100 may occur for example from a load from a seat occupant during a rapid or sudden forward deceleration of the vehicle, e.g. during an event. The shape of the cam 42 and the cam surface 44 reduces or minimizes the back-driving torque at any position of the seat pan.

In one example, the controller 104 may control the electric motor 100 to rotate at a first speed in response to receiving a user input from the user interface 110. The controller 104 may control the electric motor 100 to rotate at a second speed in response to receiving an input from the vehicle system 112. In one example, the second speed is greater than the first speed, and the speed of the electric motor 100 provides an associated speed of the seat pan 30 in an upward or downward direction as determined by the gear ratio on the transmission 102. In a further example, the first speed of the electric motor 100 may provide a vertical speed of the seat pan 30 at the forward edge within the range of 15-30 mm/s, and the second speed may be within the range of 70-120 mm/s. In one example, the second speed provides for movement of the seat pan 30 from the first position to the second position within approximately one second.

In one example, an angle between the seat pan 30 and a horizontal plane is raised by at least ten degrees by the torque tube 40 being rotated from the first angular position to the second angular position. In a further example, a ten degree movement of the seat pan 30 provides for a vertical height adjustment of 50-100 millimeters as measured at a forward edge of the seat pan 30, and in an even further example, the vertical height adjustment is approximately 65-85 millimeters. In one example, the torque tube 40 and cam 42 may be rotated through a range of 200-270 degrees between the first and second positions, although other angles of rotation are also contemplated based on the geometry of the seat and associated constraints. In other examples, the angle between the seat pan 30 and the horizontal plane is raised by less than ten degrees, for example, five degrees, or the like.

Various embodiments according to the present disclosure have associated advantages over a conventional mechanism for adjustment of the forward region 32 of the seat pan 30 such as a power screw and linkage mechanism. For example, various embodiments according to the present disclosure provide a faster speed of travel for the forward region 32 of the seat pan 30, self-locking of the gearset 102 to cancel or offset back-driving torque from the seat pan 30 during an event, use with a vehicle system 112 such as ADAS, use to adjust the seat pan position by the user via a user interface 110, and providing a secondary load path from a seat occupant to the seat pan 30 along a forward longitudinal direction of the seat assembly 10, for example during a rapid vehicle deceleration event.

While exemplary embodiments are described above, it is not intended that these embodiments describe all possible forms of the invention and the disclosure. Rather, the words used in the specification are words of description rather than limitation, and it is understood that various changes may be made without departing from the spirit and scope of the invention. Additionally, the features of various implementing embodiments may be combined to form further embodiments of the invention and the disclosure.

What is claimed is:

1. A vehicle seat assembly comprising:
a frame;
a seat pan comprising a forward region and a rearward region, the rearward region of the seat pan rotatably connected to the frame about a fixed axis of rotation in a rearward half of the frame;
a shaft supported by the frame for rotation and extending transversely to a fore and aft direction across the seat pan;
at least one cam supported by the shaft for rotation therewith, the at least one cam extending outwardly from the shaft to an associated cam surface, the cam surface supporting the forward region of the seat pan and shaped such that the forward region of the seat pan is raised relative to the rearward region in response to rotation of the shaft; and
at least one elongate rail connected to an underside of the seat pan and extending longitudinally therealong in the fore and aft direction, the cam surface of the at least one cam in contact with the at least one elongate rail.

2. The vehicle seat assembly of claim 1 wherein the cam surface is formed as an involute of a base circle.

3. The vehicle seat assembly of claim 1 wherein the cam surface is formed as an Archimedean spiral or a logarithmic spiral.

4. The vehicle seat assembly of claim 1 wherein one of the cam and the rail define a recess extending transversely therefrom, the other of the cam and the rail define a protrusion extending therefrom, the protrusion sized to be received within the recess to constrain movement of the seat pan along a vertical axis.

5. The vehicle seat assembly of claim 1 further comprising:
a gearset connected to the shaft to rotate the shaft and cam; and
an electric motor connected to the gearset to rotate in a first direction to raise the forward region of the seat pan relative to the rearward region, and to rotate in a second direction to lower the forward region of the seat pan relative to the rearward region.

6. The vehicle seat assembly of claim 5 further comprising:
a user interface to receive a user input requesting a height adjustment of the forward region of the seat pan; and
a controller in communication with the user interface and the electric motor to control the electric motor in response to the user input.

7. The vehicle seat assembly of claim 5 further comprising:
a controller in communication with the electric motor to control the electric motor to raise the forward region of the seat pan in response to receiving a signal from an active vehicle system with a sensor.

8. The vehicle seat assembly of claim 7 wherein the raised forward region of the seat pan provides a load path from an occupant to the seat in a longitudinal direction, and wherein the seat pan provides another load path from the occupant to the seat in a vertical direction.

9. The vehicle seat assembly of claim 1 wherein the cam surface is positioned aft of a forward edge of the seat pan by more than twenty five percent and less than fifty percent of a distance from the forward edge to a rearward edge of the seat pan.

10. The vehicle seat assembly of claim 1 further comprising another shaft supported by the frame for rotation and extending transversely across the seat pan, the shaft and the another shaft rotating about an axis of rotation; and
at least another cam supported by the another shaft for rotation therewith, the at least another cam extending outwardly from the another shaft to an associated another cam surface, the another cam surface supporting the forward region of the seat pan and shaped such that the forward region of the seat pan is raised relative to the rearward region in response to rotation of the another shaft.

11. A vehicle seat assembly comprising:
a frame;
a seat pan comprising a forward region and a rearward region, the rearward region of the seat pan rotatably connected to the frame about a fixed first transverse axis of rotation that is transverse to a fore and aft direction, first and second elongate rails connected to a lower surface of the forward region, the first and second elongate rails including first and second follower surfaces, and the first and second elongate rails extending longitudinally in the fore and aft direction;
a torque tube supported by the frame for rotation about a second transverse axis of rotation that is transverse to the fore and aft direction, the torque tube extending transversely across the seat pan;
first and second cams connected to the torque tube for rotation therewith and spaced apart from one another along the second transverse axis of rotation, the first and second cams extending outwardly to first and second cam surfaces, respectively, wherein the first and second cam surfaces support the forward region of the seat pan and are in contact with the first and second follower surfaces, respectively; and
an electric motor connected to the torque tube via a gearset to rotate the torque tube between a first angular position and a second angular position, the first and second cam surfaces moving the first and second follower surfaces in a direction substantially perpendicular to the second axis of rotation, wherein the first and second cam surfaces are shaped to continuously raise the forward region of the seat pan as the torque tube moves from the first position to the second position.

12. The vehicle seat assembly of claim 11 further comprising a controller to control the electric motor to rotate the torque tube and raise or lower the seat pan in response to receiving a signal indicative of a user request for a seat pan height adjustment.

13. The vehicle seat assembly of claim 11 further comprising a controller to control the electric motor to rotate the torque tube and raise the seat pan in response to receiving a signal indicative of an event from an active vehicle system.

14. The vehicle seat assembly of claim 11 wherein each of the first and second cam surfaces are formed as an involute of a base circle.

15. The vehicle seat assembly of claim 11 wherein an angle between the seat pan and a horizontal plane is raised by at least ten degrees by the torque tube being rotated from the first angular position to the second angular position.

16. The vehicle seat assembly of claim 11 wherein one of the first cam and the first follower surface defines a recess, and the other of the first cam and the first follower surface defines a protrusion, wherein the protrusion is sized to be received within the recess to constrain movement of the seat pan along a vertical axis as the first cam rotates.

17. The vehicle seat assembly of claim 11 further comprising further comprising a controller in communication with the electric motor to (i) control the electric motor and rotate the torque tube to raise the forward region of the seat pan in response to a first signal indicative of an event from an active vehicle system, and (ii) control the electric motor and rotate the torque tube to raise or lower the forward region of the seat pan in response to receiving a second signal indicative of a user request for a seat pan height adjustment.

18. The vehicle seat assembly of claim 17 wherein the controller is further configured to control the electric motor to operate at a first speed in response to receiving the first signal, and control the electric motor to operate at a second speed in response to receiving the second signal, wherein the first speed is greater than the second speed.

* * * * *